(12) United States Patent
Kim

(10) Patent No.: US 7,826,162 B2  
(45) Date of Patent: Nov. 2, 2010

(54) APPARATUS AND METHOD FOR SENSING AN EXTERNAL MAGNETIC FIELD TO PROTECT A PERPENDICULAR MAGNETIC RECORDING (PMR) HARD DISK DRIVE

(75) Inventor: Dongman Kim, Campbell, CA (US)

(73) Assignee: Samsung Electronics Co., Ltd., Suwon, Gyeonggi-Do (KR)

( * ) Notice: Subject to any disclaimer, the term of this patent is extended or adjusted under 35 U.S.C. 154(b) by 409 days.

(21) Appl. No.: 11/975,251

(22) Filed: Oct. 17, 2007

(65) Prior Publication Data

US 2009/0103210 A1    Apr. 23, 2009

(51) Int. Cl.
*G11B 19/04*    (2006.01)

(52) U.S. Cl. ......................................... 360/60

(58) Field of Classification Search ............ 360/75, 360/69, 60; 361/42
See application file for complete search history.

(56) References Cited

U.S. PATENT DOCUMENTS

| | | | |
|---|---|---|---|
| 5,777,815 A * | 7/1998 | Kasiraj et al. .................. | 360/75 |
| 6,738,216 B2 * | 5/2004 | Kawana et al. ................. | 360/75 |
| 6,753,667 B2 | 6/2004 | Sakamoto | |
| 6,972,920 B2 * | 12/2005 | Kim et al. ...................... | 360/75 |
| 6,995,950 B2 | 2/2006 | Lairson | |
| 7,002,766 B2 * | 2/2006 | Kisaka et al. .................. | 360/60 |
| 7,411,757 B2 * | 8/2008 | Chu et al. ....................... | 360/69 |
| 7,499,250 B2 * | 3/2009 | Zhang ............................ | 361/42 |
| 2003/0103287 A1 * | 6/2003 | Agematsu ...................... | 360/60 |
| 2006/0092556 A1 | 5/2006 | Hamaguchi | |
| 2006/0132951 A1 | 6/2006 | Zaitsu | |
| 2006/0245108 A1 | 11/2006 | Hsu | |
| 2007/0081276 A1 | 4/2007 | Fukuzawa | |
| 2007/0153412 A1 * | 7/2007 | Takeda et al. .................. | 360/69 |

* cited by examiner

*Primary Examiner*—Fred Tzeng  
(74) *Attorney, Agent, or Firm*—GSS Law Group

(57) ABSTRACT

A hard disk drive is disclosed including a voice coil motor and a magnetic sensor communicating with a control circuit. A magnetic sensor reading is created and used to stop access operations in response to the reading of an external magnetic field that may be strong enough to disrupt a slider accessing a rotating disk surface. Also disclosed are a main flex circuit and head stack assembly including the magnetic sensor for use in a hard disk drive. Control circuits and processors are disclosed for receiving the magnetic reading to stop access operations in hard disk drives. The hard disk drive may be a Perpendicular Magnetic Recording (PMR) hard disk drive.

19 Claims, 3 Drawing Sheets

Fig. 4
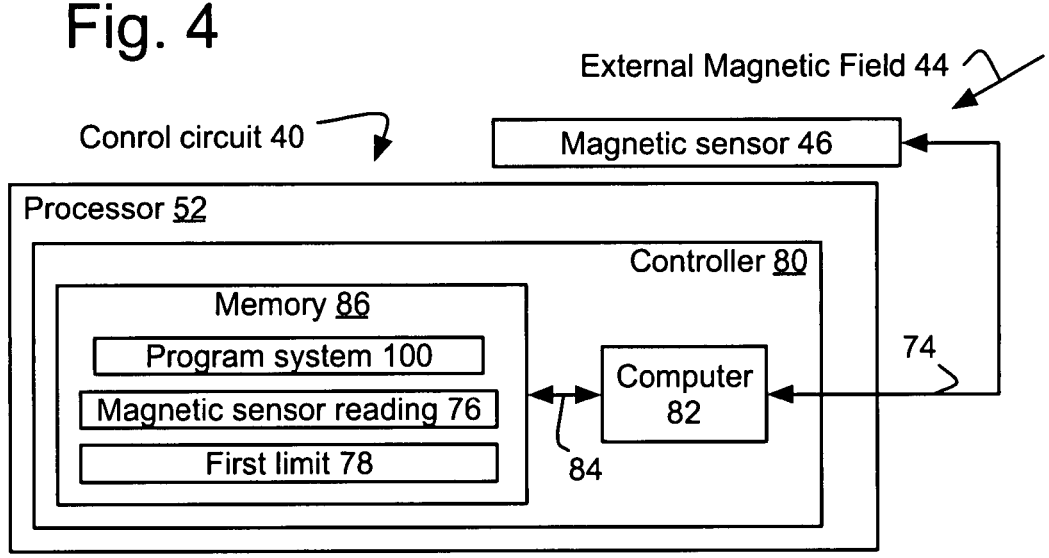
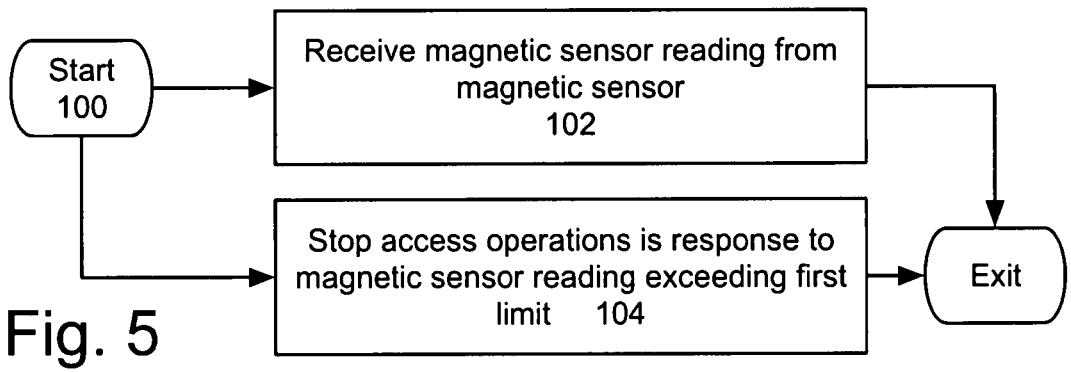
Fig. 5
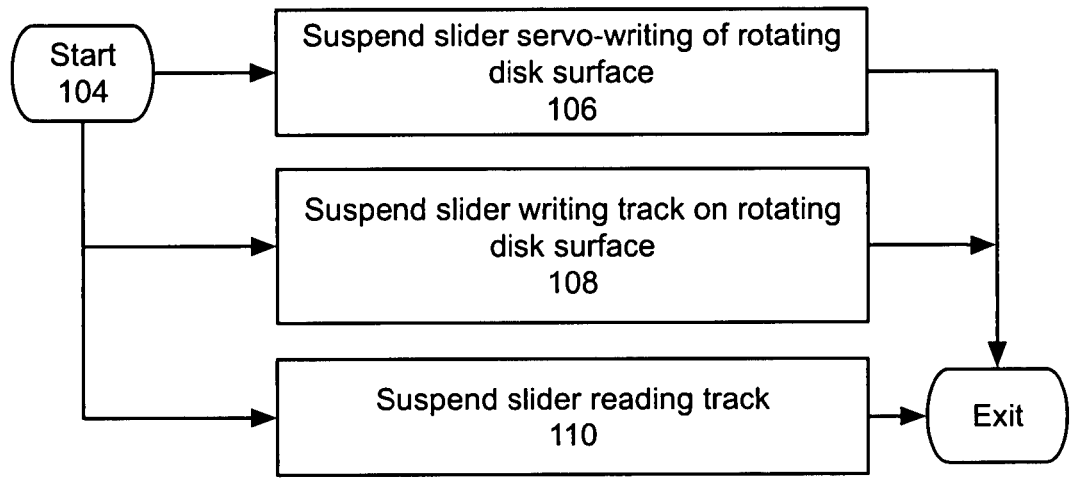
Fig. 6

APPARATUS AND METHOD FOR SENSING AN EXTERNAL MAGNETIC FIELD TO PROTECT A PERPENDICULAR MAGNETIC RECORDING (PMR) HARD DISK DRIVE

TECHNICAL FIELD

This invention relates to detecting when the external magnetic field is too strong and in response, stopping access of the disk surfaces in a hard disk drive, particularly a Perpendicular Magnetic Recording (PMR) hard disk drive.

BACKGROUND OF THE INVENTION

Until recently, the magnetic fields used in hard disk drives to access data were in a direction essentially parallel to the accessed disk surface, which is referred to as the longitudinal direction. This approach is being supplanted by an approach known as perpendicular recording. It offers greater recording densities using magnetic fields that have lines of force perpendicular to the disk surface. Such hard disk drives are called Perpendicular Magnetic Recording (PMR) hard disk drives.

Perpendicular magnetic recording is inherently susceptible to external magnetic fields. This increased sensitivity to stray fields originates from the read head interacting with a Soft Under Layer (SUL) between a PMR layer and the disk substrate. These fields particularly affect desktop/mobile products, where a magnetic bracelet on someone's wrist can come close to the hard disk drive, disrupting its access operations. Further, elevators, automobiles, trains, ventilators, and air conditioning units can also magnetically disrupt operations of a PMR hard disk drive.

These external magnetic fields may distort writing and readback signals and cause error events. Not only recorded information may be lost, but also signals for identifying tracks and servo positioning to find the tracks may be lost. High current writing in the presence of strong longitudinal magnetic fields may cause large degradation of the Burst Error Rate (BER). Consequently, a PMR hard disk drive needs to be robust against stray fields in any direction with field strengths of up to 50 Oerstedt (Oe) under otherwise nominal writing conditions without needing to erase the data and without significant degradation of the BER performance.

Prior attempts to address this problem have included shielding the slider and use of the read head to estimate the longitudinal component of the external magnetic field. Both approaches have problems. Adding shielding requirements to the slider complicates a sensitive part of the PMR hard disk drive. Trying to guess the longitudinal component of the external magnetic field using the read head is questionable, since the read head is focused on sensing the perpendicular magnetic field off the disk surface. An economical and reliable approach is needed to monitor external magnetic fields within a PMR hard disk drive that can be used to protect it from strong longitudinal magnetic fields without requiring specialized magnetic shielding of the slider.

SUMMARY OF THE INVENTION

One embodiment of the invention is a hard disk drive including a magnetic sensor communicating with a control circuit to create a magnetic sensor reading used to stop access operations in response to the magnetic sensor reading indicating at least one component of an external magnetic field exceeds a first threshold. The component may preferably be a longitudinal component parallel to the disk surfaces, and the hard disk drive may preferably be a Perpendicular Magnetic Recording (PMR) hard disk drive. The first threshold may indicate that the external magnetic field is probably strong enough to disrupt the access operations. It may further indicate the external magnetic field is very likely to disrupt access operations. The magnetic sensor may preferably be a three axis magnetic sensor.

One method of the invention uses a magnetic sensor in a hard disk drive to create a magnetic sensor reading, which is received by a control circuit and used to stop access operations of the disk surfaces in response to the magnetic sensor reading exceeding a first limit. The magnetic sensor reading may exceed the first limit in response to the component of the external magnetic field exceeding the first threshold.

Embodiments of the invention include a control circuit and/or a processor to be included in the control circuit, for receiving a magnetic sensor reading from a magnetic sensor. The control circuit and/or the processor use the reading to stop access operations in response to the magnetic sensor reading exceeding the first limit.

Other embodiments of the invention include the magnetic sensor, for example, the main flex circuit, the head stack assembly and the hard disk drive.

BRIEF DESCRIPTION OF THE DRAWINGS

FIG. 4 shows some details of an example embodiment of the control circuit of FIG. 3, with the processor including at least one instance of a controller and the controller including a computer accessibly coupled via a buss to a memory. The computer is instructed by a program system to at least partly implement receiving the magnetic sensor reading and/or stopping access operations in response to the magnetic sensor reading exceeding the first limit;

FIG. 5 shows a detail of the program system of FIG. 4 instructing the computer to receive the magnetic sensor reading from the magnetic sensor and/or stop access operations in response to the magnetic sensor reading exceeding the first limit; and FIG. 6 shows some further details of stopping the access operations by suspending servo-writing the rotating disk surface and/or suspending writing a track on the rotating disk surface and/or suspending reading the track.

DETAILED DESCRIPTION

This invention relates to using a magnetic sensor to detect the external magnetic field, and in particular, to detect when the longitudinal component of the external magnetic field is too strong. And, in response, stopping access of the disk surfaces in a hard disk drive, particularly a Perpendicular Magnetic Recording (PMR) hard disk drive.

Figure 1:
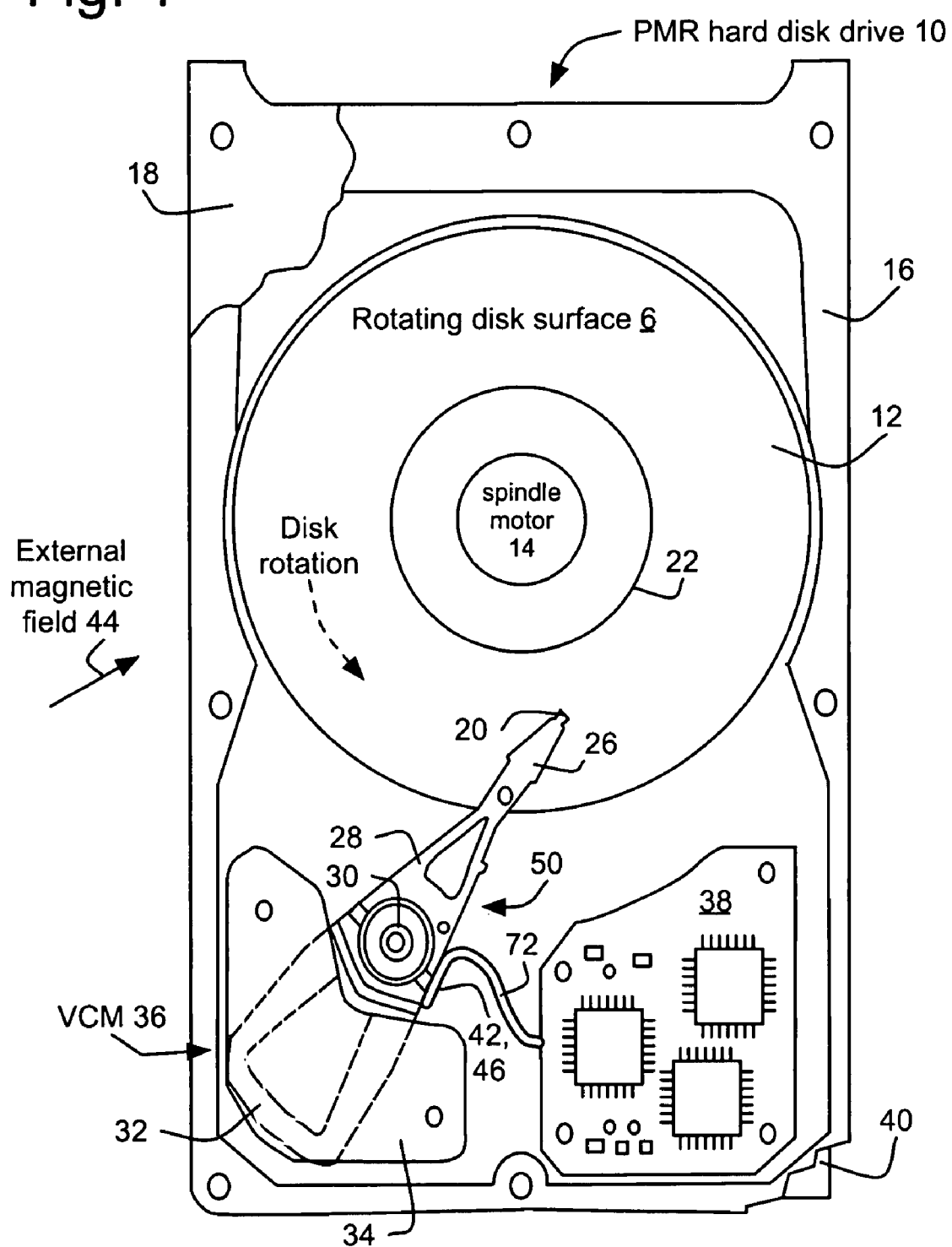
FIG. 1 shows a cutaway view of a preferred embodiment of a Perpendicular Magnetic Recording (PMR) hard disk drive, including a disk rotated by a spindle motor to create a rotating disk surface. A voice coil motor positions a slider over the rotating disk surface and includes a main flex circuit perpendicular to the disk surfaces. The main flex circuit includes a magnetic sensor that is used to detect external magnetic fields. A control circuit receives a magnetic sensor reading, which is used to stop the slider's access of the rotating disk surface in response to the external magnetic field has a component that may disrupt the access operation.

Referring to the drawings more particularly by reference numbers, FIG. 1 shows a cutaway view of a preferred embodiment of the Perpendicular Magnetic Recording (PMR) hard disk drive 10, including at least one disk 12 rotated by a spindle motor 14 to create a rotating disk surface 6. A voice coil motor 36 positions a slider 20 over the rotating disk surface and includes a main flex circuit 42 perpendicular to the disk surfaces. The main flex circuit preferably includes at least one magnetic sensor 46 that is used to detect external magnetic fields 44. A control circuit 40 receives a magnetic field sensor reading from the magnetic sensor, which is used stop the slider's access of the rotating disk surface to prevent access disruptions in the presence of strong external magnetic fields, in particular external magnetic fields with a strong longitudinal component in the plane of the rotating disk surface.

As used herein a magnetic sensor 46 provides a magnetic sensor reading which may be communicated via a ribbon cable 72 that is often used for communication between the main flex circuit 42 and the control circuit 40. In certain preferred embodiments, the magnetic sensor may indicate the three dimensional field strength of the external magnetic field, supporting its use in the main flex circuit both close to the rotating disk surfaces and perpendicular to those surfaces in a PMR hard disk drive 10, which tends to be sensitive to the longitudinal component of external magnetic fields.

The magnetic sensor 46 may include two perpendicular Hall effect sensors. The magnetic sensor may be housed in a flat package. The magnetic sensor may further include the two perpendicular Hall effect sensors covered with a magnetically concentrating material, which bends the magnetic field through it, so that the two Hall effect sensors each report the magnetic field perpendicular to the package as well as the parallel field components. By subtracting the reported effects, the perpendicular magnetic field component is provided. By adding the reported effects, the parallel magnetic field components are provided. This is one preferred mechanism for a magnetic sensor, sometimes referred to as a three-axis magnetic sensor for use in a hard disk drive 10 to sense the external magnetic field 44. In some embodiments, three axis magnetic sensors may be preferred as described, manufactured and sold by the Melexis company.

The hard disk drive 10 further includes the spindle motor 14 mounted on a disk base 16. The voice coil motor 36 includes a voice coil 32 coupled to a head stack assembly 50 and mounted by an actuator pivot 30 to the disk base. The head stack assembly further includes at least one actuator arm 28 coupling through a head gimbal assembly 26 to the slider 20. The slider may or may not include shielding intended to dampen the effect of the external magnetic field 44. When the slider includes such shielding, the method of this invention insures that the shielding will not be overcome by strong external magnetic fields and can serve to reduce the slider shielding requirements.

Figure 2:
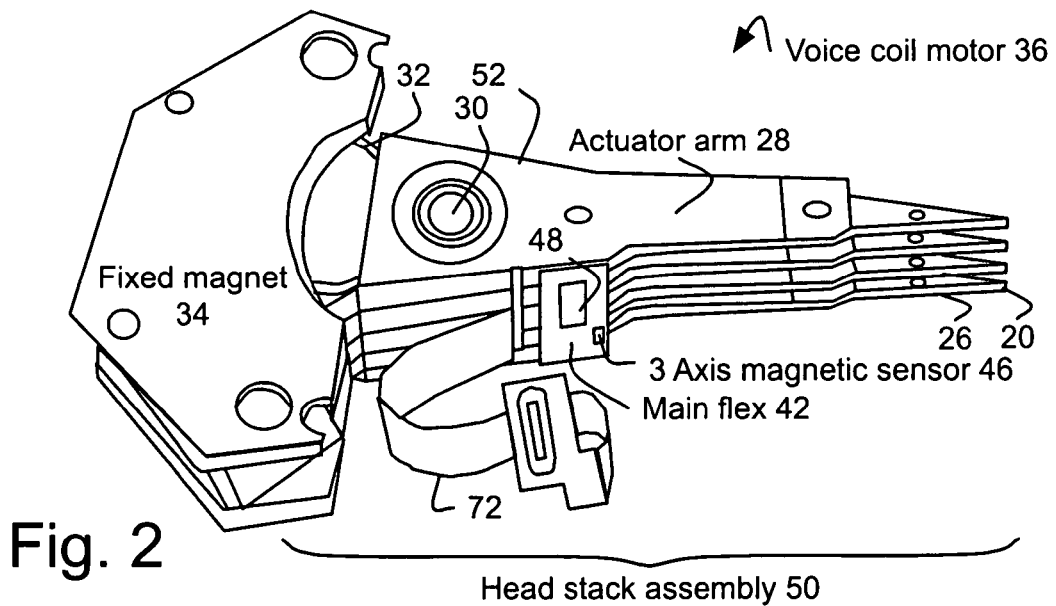
FIG. 2 shows some details of the hard disk drive, the voice coil motor, the head stack assembly, the main flex circuit and the magnetic sensor. The magnetic sensor may preferably be a three axis magnetic sensor housed in a flat package. The main flex circuit further includes a preamplifier that may be used to communicate with the magnetic sensor to provide the magnetic sensor reading.

FIG. 2 shows some details of the hard disk drive 10, the voice coil motor 36, the head stack assembly 50, the main flex circuit 42 and the magnetic sensor 46. The magnetic sensor may include a three axis magnetic sensor housed in a flat package. The main flex circuit may further include a preamplifier 48 that may be used to communicate with the magnetic sensor to provide the magnetic sensor reading.

The main flex circuit 42 and the magnetic sensor 46 may be mounted on the head stack assembly 50 perpendicular to the disks 12 and their rotating disk surfaces 6. The perpendicular component of the magnetic field through the preferred three axis magnetic sensor is essentially parallel to the rotating disk surface 6 which will be referred to as the longitudinal component. By measuring this longitudinal component of the external magnetic field 44, the hard disk drive 10, and in particular the control circuit 40, can determine when it is safe to access the disk surface with the slider 20.

Figure 3:
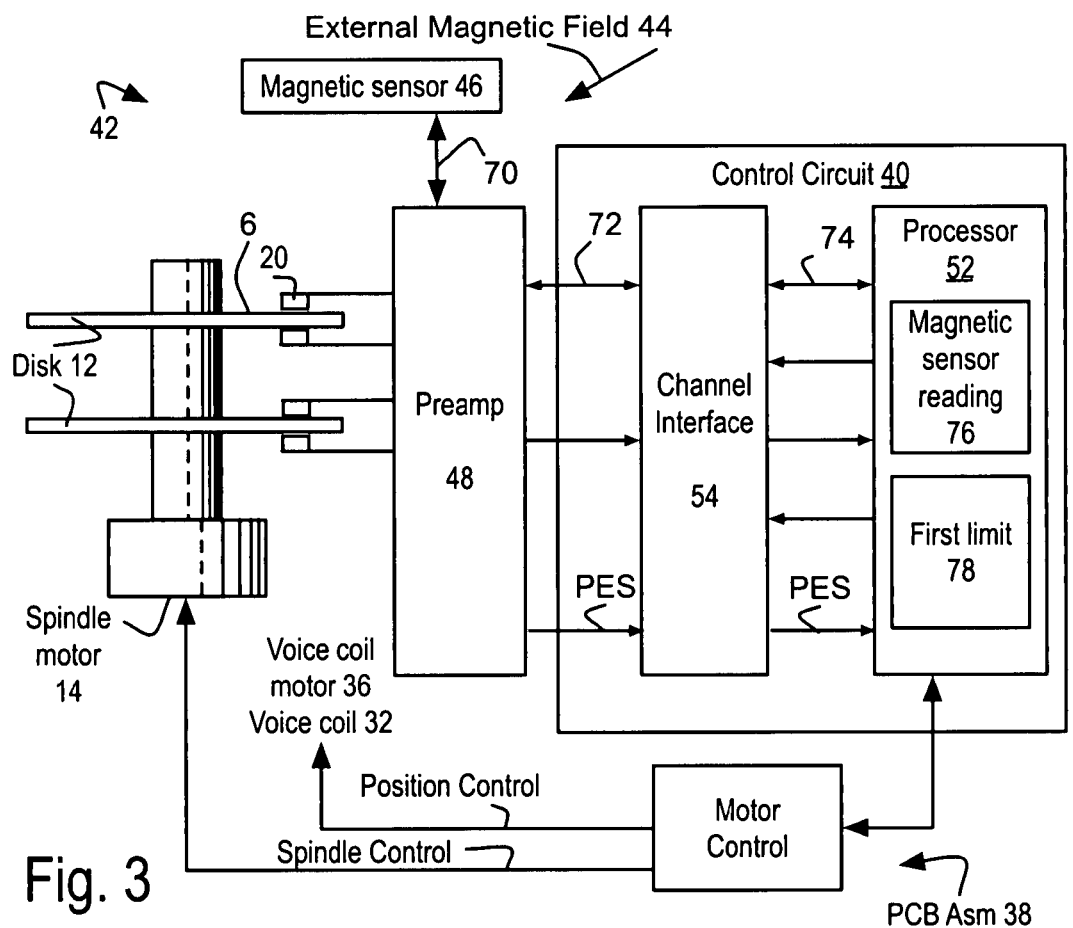
FIG. 3 shows in a schematic fashion some preferred details of the circuitry of the hard disk drive. The magnetic sensor may communicate via a preamplifier then a channel interface to provide the magnetic sensor reading to the control circuit. The control circuit receives the magnetic sensor reading and stops the slider from accessing the rotating disk surface in response to magnetic sensor reading exceeding the first limit.

FIG. 3 shows in a schematic fashion some details of the circuitry of the hard disk drive 10. The magnetic sensor 46 may communicate 70 with the preamplifier 48 of the main flex circuit 42, which may then communicate 72 with the channel interface 54 to provide 74 the magnetic sensor reading 76 to the control circuit 40. The communications 72 between the main flex circuit and the control circuit may be performed using a ribbon cable as seen in FIGS. 1 and 2. The control circuit receives the magnetic sensor reading and stops the slider 20 from accessing the rotating disk surface 6 in response to magnetic sensor reading indicating that the longitudinal component of the external magnetic field 44 is too strong and may disrupt the access operation, which is generally referred to herein as at least one of the components of the external magnetic field exceed a first threshold. The control circuit may determine this by determining whether at least part of the magnetic sensor reading exceeds the first limit 78.

As used herein, a first number exceeds a second number when the first is greater than the second number, or in some embodiments when the first is greater than or equal to the second number. In some embodiments, the first threshold may be at least fifty Oe. In other embodiments, the first threshold may further be at least 25 Oe. And in still other embodiments, the first threshold may be at least twelve Oe. The longitudinal component may be a weighted sum of two or three of the three-vector components of the magnetic sensor reading 76.

The control circuit 40 may preferably include a processor 52 for communicating via communication 74 with the magnetic sensor 46 to receive the magnetic sensor reading 76 and the processor may further communicate with the slider 20 to stop the slider from accessing the rotating disk surface 6. Both of these communications may use the channel interface 54 and may also include the channel interface communicating with the preamplifier 48.

The preamplifier's 48 communication 70 with the magnetic sensor 46 may include at least one analog signal. In certain preferred embodiments, the three axis magnetic sensor may include two current inputs and two voltage outputs coupled to the preamplifier to communicate the magnetic sensor reading. Alternatively, the communication may use a digital communications protocol that may further be a serial communication protocol.

The processor 52 may further communicate through the channel interface 54 with the preamplifier 48 to stimulate the slider 20 and the write head of the slider to create servo-positioning waveforms on the rotating disk surface 6, which will be referred to as servo-writing the disk surface. Frequently, two pairs of quadrant offset analog signals are used to form the servo-positioning waveforms. The servo-positioning waveforms are used to indicate how close the read head of the slider is to a track 22 written on the rotating disk surface. This indication is often called the Position Error Signal (PES), which is decoded by the preamplifier and sent through the channel interface to the processor. The processor may use the PES signal in directing the voice coil motor 36, and possibly a micro-actuator coupled to the slider in the head gimbal assembly 26, to position the slider to follow the track when reading or writing to it.

The processor 52 may preferably direct a motor control interface to create a spindle control signal to stimulate the spindle motor 14 to rotate the disks 12, creating at least one rotating disk surface 6. In some embodiments of the PMR hard disk drive 10, the motor control interface may be part of the printed circuit board assembly 38.

The processor 52 may preferably direct the motor control interface to create a position control signal to stimulate a voice coil 32 in the voice coil motor 36. The voice coil forms a magnetic field in response to the position control signal that interacts with the fixed magnet assembly 34 to pivot the head stack assembly 50 through the actuator pivot 30 to position the slider 20 over the track 22 on the rotating disk surface 6.

Writing a track 22 may include the following operations in the hard disk drive 10. The processor 52 may encode data into a payload component of the sectors included in the track, each with its own error control coding overhead, which are successively sent to the write head as a fluctuating electrical signal which stimulates the write head to alter the magnetic layer of the disk surface, which in PMR hard disk drives, alters the PMR magnetic layer with field lines perpendicular to that surface. The read head is used to magnetically sense the servo-positioning waveform written on the disk surface, and using the preamplifier 48, decodes these four modulated signals to create the PES. The processor receives the PES signal from the read head through the preamplifier and the channel interface 54 as a feedback used to keep the write head as close as possible to the track using the position control signal and possibly one or more control signals sent to the micro-actuator coupled to the slider in its head gimbal assembly 26.

Reading the track 22 involves a similar track following process. The write head is not active and the read head is used not only to read the data as an analog waveform, but also to read the servo-positioning waveform. The preamplifier 48 separates these waveforms, decodes the PES from the servo-positioning waveform and sends a digitized stream of the track readings through the channel interface 54 to the processor 52, where the sectors are presented to an error correction detection unit to extract the data payload forming the data stored in the track on the rotating disk surface 6.

Of these access operations, servo-writing the rotating disk surface 6, writing the track 22 and reading the track, the most commonly performed operation with the greatest potential for damage is writing the track. Disrupting these write operations may damage the servo-positioning waveforms, possibly rendering all data access of at least part of the disk surface useless. Disrupting these write operations may also damage track identification signals that are part of the analog waveform written to the disk surface. In some embodiments of the invention, the three axis magnetic sensor 46 may be used to stop such write operations in response to the PMR hard disk drive 10 being in the presence of an external magnetic field 44 with a large enough longitudinal component to possibly disrupt the write operations. A high probability of disruption may be at least twenty five percent, may further be at least thirty percent, and may further be at least fifty percent.

The processor 52 may comprise at least one instance of at least one controller 80 that receives at least one input, maintains and updates at least one state, and generates at least one output based upon the value of at least one of the inputs and the states.

FIG. 4 shows an example embodiment of the control circuit 40 of FIG. 3, with the processor 52 including at least one instance of a controller 80, the controller including the computer 82 accessibly coupled 84 via a buss to a memory 86. The computer is instructed by a program system 100 to at least partly implement receiving the magnetic sensor reading 76 and/or stopping access operations in response to at least part of the magnetic sensor reading exceeding the first limit 78. Put another way, the access operation is stopped in response to the reading indicating the longitudinal component of the external magnetic field 44 will probably disrupt those operations.

The computer 82 may include at least one data processor and at least one instruction processor instructed by the program system 100 to at least partly implement receiving the magnetic sensor reading 76 and/or stopping the slider 20 accessing the rotating disk surface 6 in response to the magnetic sensor reading exceeding the first limit 78. Each of the data processors may be instructed by at least one of the instruction processors.

In certain embodiments, the controller 80 may include a finite state machine and/or a neural network and/or an inferential engine and/or the computer 82 instructed by a program system 100 including at least one program step residing in the memory. Note that the program steps included in the program system may represent the actions of various states of the finite state machine, and/or the neural node response of the neural network, and/or the inferred actions of the inferential engine, which may implement a fuzzy logic controller.

FIG. 5 shows a detail of the program system 100 of FIG. 4 instructing the computer 82 to at least partly implement at least one of these program steps. Program step 102 supports receiving the magnetic sensor reading 76 from the magnetic sensor 46. Program step 104 supports stopping access operations in response to the magnetic sensor reading exceeding the first limit 78.

FIG. 6 shows some further details of the program step 104 support for stopping the access operations, which may include at least one of the following program steps. Program step 106 suspends the slider 20 servo-writing the rotating disk surface 6. Program step 108 suspends the slider writing the track 22 on the rotating disk surface. And program step 110 suspends the slider reading the track. Stopping the access operations may further include parking the sliders.

The magnetic sensor 46 may indicate the longitudinal component of the external magnetic field 44 to the control circuit 40 through the use of more than one magnetic sensor reading 76. The hard disk drive 10 may include more than one magnetic sensor. Two magnetic sensors may be mounted on the main flex circuit 42, one parallel the main flex circuit and the other perpendicular. The magnetic sensor may be located outside the voice coil motor 36.

The preceding embodiments provide examples of the invention and are not meant to constrain the scope of the following claims.

What is claimed is:

1. A hard disk drive, comprising:
a disk base;
a spindle motor mounted on said disk base;
at least one disk mounted on said spindle motor to create a rotating disk surface;
a voice coil motor mounted on said disk base to pivot a slider over said rotating disk surface to access said rotating disk surface;
at least one magnetic sensor outside said slider for sensing an external magnetic field to create a magnetic sensor reading received by a control circuit; and said control circuit configured to stop said slider accessing said rotating disk surface in response to said magnetic sensor reading indicating at least one component of said external magnetic field exceeds a first threshold, with said at least one component a longitudinal component to the plane of said rotating disk surface employing Perpendicular Magnetic Recording (PRM).

2. The hard disk drive of claim 1, wherein said disk includes at least one perpendicular magnetic recording medium on a disk surface to enable said hard disk drive as a perpendicular magnetic recording hard disk drive.

3. The hard disk drive of claim 1, wherein said voice coil motor comprises said magnetic sensor.

4. The hard disk drive of claim 3, wherein said voice coil motor further comprises said magnetic sensor mounted on a main flex circuit perpendicular to said rotating disk surface.

5. The hard disk drive of claim 4, wherein said main flex circuit further includes a preamplifier communicatively coupled to said magnet sensor to provide said magnetic sensor reading for said control circuit.

6. The hard disk drive of claim 1, wherein said control circuit, comprises:
a processor configured to communicate with said magnetic sensor to receive said magnetic sensor reading; and
said processor configured to communicate with said slider to stop said slider accessing said rotating disk surface.

7. A method, comprising the step of: using at least one magnetic sensor in a hard disk drive to stop access operations of a rotating disk surface within said hard disk drive in response to at least one component of an external magnetic field exceeding a first threshold, with said at least one component a longitudinal component to the plane of said rotating disk surface employing Perpendicular Magnetic Recording (PRM).

8. The method of claim 7, wherein said first threshold is set at a value which if exceeded by said external magnetic field has a high probability of disrupting said access operations.

9. The method of claim 7, wherein the step using said magnetic sensor, further comprises the steps of:
operating said magnetic sensor to create a magnetic sensor reading; and
stopping a slider accessing said rotating disk surface in response to said magnetic sensor reading indicating said first component exceeding a first limit.

10. The method of claim 9, wherein the step stopping said slider accessing said rotating disk surface, further comprises at least one of the steps of:
suspending said slider servo-writing said rotating disk surface;
suspending said slider writing a track on said rotating disk surface; and
suspending said slider reading said track on said rotating disk surface.

11. The method of claim 7, wherein said magnetic sensor includes a three axis magnetic sensor, and wherein the step using said magnetic sensor, further comprises the step of:
using said three axis magnetic sensor in said hard disk drive to stop said access operations in response to said at least one component of said external magnetic field exceeding said first threshold.

12. The method of claim 11, wherein the step using said three axis magnetic sensor, further comprises the step of:
using said three axis magnetic sensor mounted perpendicular to said rotating disk surface to stop said access operations in response to said external magnetic field has a longitudinal component that exceeding said first threshold.

13. A head stack assembly, comprising: at least one slider and at least one magnetic sensor separate from said slider to create a magnetic sensor reading of an external magnetic field affecting said slider indicating a longitudinal component to the plane of a disk surface.

14. The head stack assembly of claim 13, wherein said magnetic sensor includes a three axis magnetic sensor.

15. The head stack assembly of claim 13, further comprising a main flex circuit, comprising: said magnetic sensor to create a magnetic sensor reading.

16. The head stack assembly of claim 15, wherein said main flex circuit, further comprising: a preamplifier communicatively coupled to said magnetic sensor to provide said magnetic sensor reading.

17. A processor, comprising:
a communicative coupling configured to receive at least one magnetic sensor reading from at least one magnetic sensor; and
said processor configured to stop an access operation in response to said magnetic sensor reading indicating a first component of said magnetic sensor reading exceeds a first limit, with said first component a longitudinal component to the plane of a rotating disk surface employing Perpendicular Magnetic Recording (PRM).

18. The processor of claim 17, further comprising at least one instance of at least one controller, said controller including a computer accessibly coupled to a memory and instructed by a program system including at least one program step residing in said memory.

19. A control circuit, comprising: said processor of claim 17, further comprising:
said processor configured to receive said magnetic sensor reading from said magnetic sensor; and
said processor configured to stop an access operation when said magnetic sensor reading indicates a first component of said magnetic sensor reading exceeds a first limit.

* * * * *